United States Patent [19]
Katto

[11] Patent Number: 5,740,277
[45] Date of Patent: Apr. 14, 1998

[54] IMAGE ENCODING DEVICE IN WHICH ZERO-VALUED POINTS AND POINTS SUBORDINATE THERETO ARE NOT ENCODED

[75] Inventor: Jiro Katto, Tokyo, Japan

[73] Assignee: NEC Corporation, Tokyo, Japan

[21] Appl. No.: 559,270

[22] Filed: Nov. 15, 1995

[30] Foreign Application Priority Data

Nov. 15, 1994 [JP] Japan .................. 6-280915

[51] Int. Cl.$^6$ .................. G06K 9/36
[52] U.S. Cl. .................. 382/232; 382/240
[58] Field of Search .................. 382/231, 233, 382/234, 235, 240, 245, 248, 250, 251; 358/261.1–261.4, 430–433, 426, 452; 364/715.02; 348/390, 398, 401–404, 409, 411, 412, 415, 416, 419, 420

[56] References Cited

U.S. PATENT DOCUMENTS

| | | | |
|---|---|---|---|
| 4,447,886 | 5/1984 | Meeker | 378/403 |
| 4,751,742 | 6/1988 | Meeker | 382/240 |
| 5,223,926 | 6/1993 | Stone et al. | 382/250 |
| 5,315,670 | 5/1994 | Shapiro | 382/232 |
| 5,339,164 | 8/1994 | Lim | 382/234 |
| 5,552,832 | 9/1996 | Astle | 382/245 |

FOREIGN PATENT DOCUMENTS

| | | |
|---|---|---|
| 4245863 | 9/1992 | Japan . |
| 6245077 | 9/1994 | Japan . |

OTHER PUBLICATIONS

John W. Woods et al, "Subband Coding of Images", *IEEE Transactions on Acoustics, Speech and Signal Processing*, vol. ASSP–34, No. 5, Oct. 1986, pp. 1278–1288.

Primary Examiner—Jose L. Couso
Attorney, Agent, or Firm—Sughrue, Mion, Zinn, Macpeak & Seas, PLLC

[57] ABSTRACT

In an image encoding device operable to an input image signal to encode the input image signal into an output encoded signal, the image encoding device comprises an decomposing arrangement responsive to the input image signal for decomposing the input image signal into a plurality of frequency subbands each of which includes a plurality of sample points. The frequency subbands are classified into lower frequency subbands and higher frequency subbands. The sample points in the frequency subbands are divided into a plurality of subsets of sample points. The sample points in each of the subsets represent the same domain on the input image signal. Connected to the decomposing arrangement, an encoding arrangement encodes the sample points subset by subset in consideration of correlation between the frequency subbands to produce the output encoded signal. When a particular sample point in the lower frequency subband indicates zero, the encoding arrangement carries out no encoding operation on subordinate sample points in the higher frequency band related to the particular sample point in the lower frequency band. The encoding arrangement may encode the sample points frequency subband by frequency subband in consideration of correlation between the frequency subbands.

42 Claims, 10 Drawing Sheets

SUBSET OF SAMPLE POINTS REPRESENTING
THE SAME REGION IN INPUT IMAGE SIGNAL

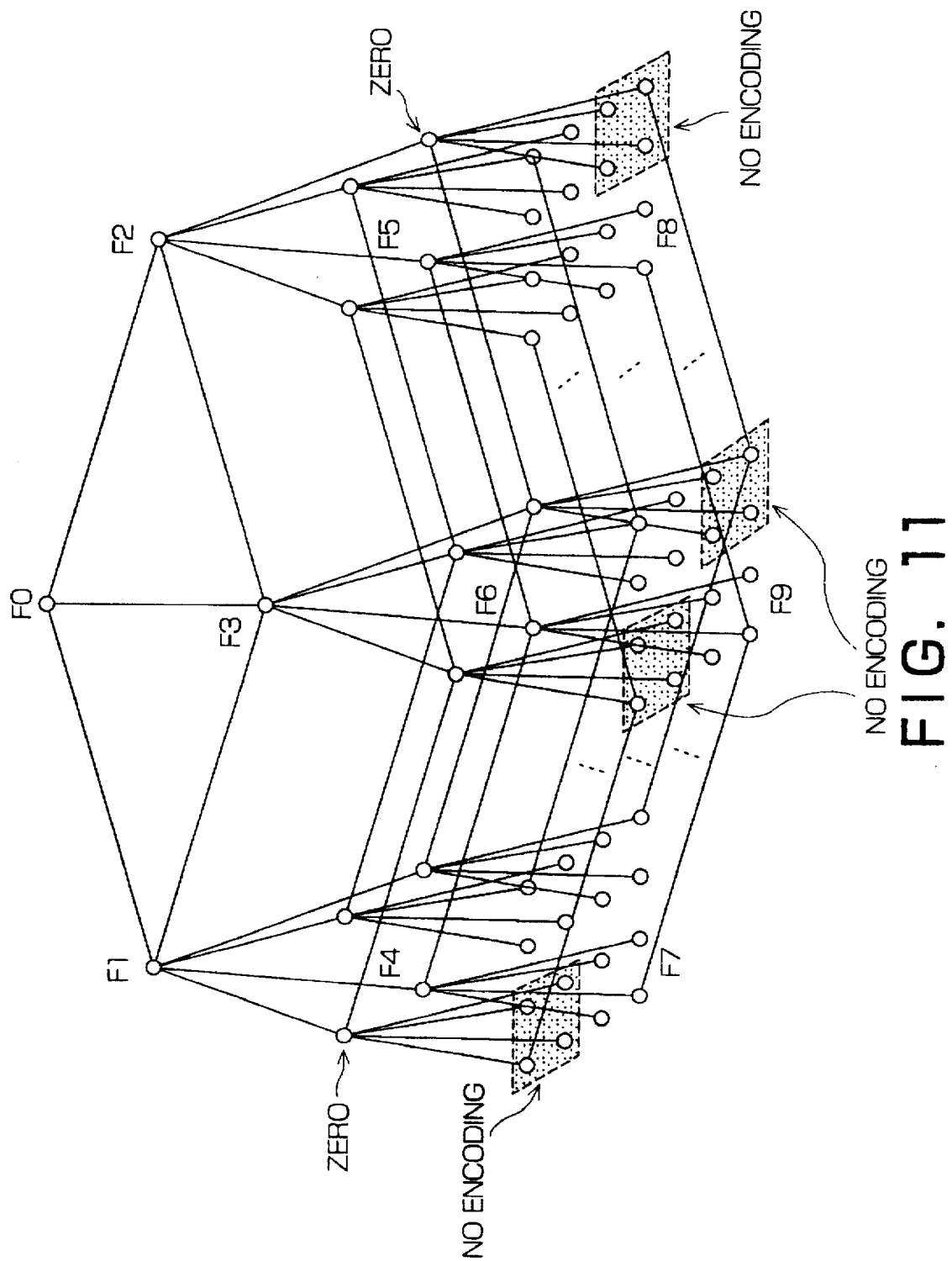

IMAGE ENCODING DEVICE IN WHICH ZERO-VALUED POINTS AND POINTS SUBORDINATE THERETO ARE NOT ENCODED

BACKGROUND OF THE INVENTION

This invention relates to an image encoding device of an input image signal and, more particularly, to a subband encoding device.

As is well known in the art, there are, as various high efficient encoding techniques for an input image signal, subband encoding technique for encoding an input image signal by decomposing the input image signal into a plurality of frequency subbands, hierarchical encoding technique, wavelet conversion encoding technique, and so on.

A conventional image encoding device comprises a subband decomposing circuit, a plurality of quantizing circuits, and an encoding circuit. The input image signal is decomposed into a plurality of subband components and subsampled by the subband decomposing circuit, quantized by the quantizing circuits, and encoded by the encoding circuit.

Various methods are known as methods of encoding the subband components obtained in the above-mentioned manner. One method is described by J. W. Woods and S. D. O'Neil a paper submitted to "IEEE TRANSACTIONS ON ACOUSTICS, SPEECH, AND SIGNAL PROCESSING", Vol. ASSP-34, No. 5, pages 2091–2110, Oct. 1986, under the title of "Subband Coding of Images". J. W. Woods et al discloses a method of encoding the subband components subband by subband. The subband components are independently encoded in no consideration of correlation between the subband components.

Another method is disclosed in Japanese Unexamined Patent Prepublication of Kôkai No. Hei 4-245,863, namely, 245,863/1992 having the title of invention "ENCODING SYSTEM FOR HIERARCHIZED SIGNAL". According to Kôkai No. Hei 4-245,863, a plurality of subsets of sample points are constructed on the basis of that sample points included in each frequency subband represent which temporal domain and/or spatial domain and encoding is carried out for the sample points subset by subset. Scanning is carried out for the subsets of the sample points from the sample point of low frequency subband to the sample point of high frequency subband. Run length encoding is carried out for the signal having a signal level of zero. A code indicative of discontinuity of the scanning (which is called a scanning discontinuous code) is used for a final sequence of zero-level signals without using of a run-length signal. In addition, in order to improve the encoding efficiency, a method of determining a scanning direction of sample points in consideration of a characteristic of the input image signal is disclosed in Japanese Unexamined Patent Prepublication of Kôkai No. Hei 6-245,077, namely, 245,077/1994 having the title of invention "WAVELET CONVERSION ENCODING SYSTEM".

However, in the above-mentioned encoding methods, encoding is carried out for sample points of the high frequency subband before appearance of the scanning discontinuous code although sample points of the low frequency subband have signal level of zero. In addition, above-mentioned encoding methods must use the scanning discontinuous code for the final sequence of zero-level signals.

Still another method is disclosed in U.S. Pat. No. 5,315,670 issued to Jerome M. Shapiro. A digital data processing system according to Shapiro includes means for generating a tree structure of data representative coefficients, the tree structure having multiple paths from coefficients generated at a level of coarsest information to coefficients generated at a level of relatively finer information. The coefficients are evaluated to distinguish between significant and insignificant coefficients. Means are also included for generating a dedicated symbol representing a related association of insignificant coefficients within the tree structure, from a root coefficient of the tree structure to a set of end coefficients of the tree structure. The symbol represents that neither the root coefficient of the tree structure nor any descendant of the root coefficient has a magnitude greater than a given reference level.

As mentioned above, the digital data processing system according to Shapiro must use the dedicated symbol representing the related association of insignificant coefficients within the tree structure.

SUMMARY OF THE INVENTION

It is therefore an object of this invention to provide an image encoding device using correlation between subband components without generating useless additional information.

Other objects of this invention will become clear as the description proceeds.

On describing the gist of this invention, it is possible to understand that an image encoding device is operable to an input image signal to encode the input image signal into an output encoded signal.

According to a first aspect of the invention, the above-mentioned image encoding device comprises decomposing means responsive to the input image signal for decomposing the input image signal into a plurality of frequency subbands each of which includes a plurality of sample points. The frequency subbands are classified into lower frequency subbands and higher frequency subbands. The sample points in the frequency subbands are divided into a plurality of subsets of sample points. The sample points of each of the subsets represent the same domain on the input image signal. Connected to the decomposing means, encoding means encodes the sample points subset by subset in consideration of correlation between the frequency subbands to produce the output encoded signal. When a particular sample point in the lower frequency subband indicates zero, the encoding means carries out no encoding operation on subordinate sample points in the higher frequency band related to the particular sample point in the lower frequency band.

According to a second aspect of the invention, the above-mentioned image encoding device comprises decomposing means responsive to the input image signal for decomposing the input image signal into a plurality of frequency subbands each of which includes a plurality of sample points. The frequency subbands are classified into lower frequency subbands and higher frequency subbands. The sample points in the frequency subbands are divided into a plurality of subsets of sample points. The sample points in each of the subsets represent the same domain on the input image signal. Connected to the decomposing means, encoding means encodes the sample points subset by subset in consideration of correlation between the frequency subbands to produce the output encoded signal. When a particular sample point in the lower frequency subband indicates zero, the encoding means calculates a sum of absolute values of subordinate sample points in the higher frequency subband related to the particular sample point of the lower frequency subband, and then the encoding means encodes the subordinate sample points in the higher frequency band only when the sum of the absolute values is greater than a predetermined threshold value. Otherwise the encoding means carries out no encoding operation on the subordinate sample points in the higher frequency subband.

According to a third aspect of the invention, the above-mentioned image encoding device comprises decomposing means responsive to the input image signal for decomposing the input image signal into a plurality of frequency subbands each of which includes a plurality of sample points. The frequency subbands are classified into lower frequency subbands and higher frequency subbands. The sample points in the frequency subbands are divided into a plurality of subsets of sample points. The sample points in each of the subsets represent the same domain on the input image signal. Connected to the decomposing means, encoding means encodes the sample points subset by subset in consideration of correlation between the frequency subbands to produce the output encoded signal. When a particular sample point in the lower frequency subband indicates zero, the encoding means calculates a sum of square of subordinate sample points in the higher frequency subband related to the particular sample point of the lower frequency subband, and then the encoding means encodes the subordinate sample points in the higher frequency band only when the sum of the square is greater than a predetermined threshold value. Otherwise the encoding means carries out no encoding operation on the subordinate sample points in the higher frequency subband.

According to a fourth aspect of the invention, the above-mentioned image encoding device comprises decomposing means responsive to the input image signal for decomposing the input image signal into a plurality of frequency subbands each of which includes a plurality of sample points. The frequency subbands are classified into lower frequency subbands and higher frequency subbands. Connected to the decomposing means, encoding means encodes the sample points frequency subband by frequency subband in consideration of correlation between the frequency subbands to produce the output encoded signal. When a particular sample point in the lower frequency subband indicates zero, the encoding means carries out no encoding on subordinate sample points in the higher frequency band related to the particular sample point in the lower frequency band.

According to a fifth aspect of the invention, the above-mentioned image encoding device comprises decomposing means responsive to the input image signal for decomposing the input image signal into a plurality of frequency subbands each of which includes a plurality of sample points. The frequency subbands are classified into lower frequency subbands and higher frequency subbands. Connected to the decomposing means, encoding means encodes the sample points frequency subband by frequency subband in consideration of correlation between the frequency subbands to produce the output encoded signal. When a particular sample point in the lower frequency subband indicates zero, the encoding means calculates a sum of absolute values of subordinate sample points in the higher frequency subband related to the particular sample point of the lower frequency subband, and then the encoding means encodes the subordinate sample points in the higher frequency band only when the sum of the absolute value is greater than a predetermined threshold value. Otherwise the encoding means carries out no encoding on the subordinate sample points in the higher frequency subband.

According to a sixth aspect of the invention, the above-mentioned image encoding device comprises decomposing means responsive to the input image signal for decomposing the input image signal into a plurality of frequency subbands each of which includes a plurality of sample points. The frequency subbands are classified into lower frequency subbands and higher frequency subbands. Connected to the decomposing means, encoding means encodes the sample points frequency subband by frequency subband in consideration of correlation between the frequency subbands to produce the output encoded signal. When a particular sample point in the lower frequency subband indicates zero, the encoding means calculates a sum of square of subordinate sample points in the higher frequency subband related to the particular sample point of the lower frequency subband, and then the encoding means encodes the subordinate sample points in the higher frequency band only when the sum of the square is greater than a predetermined threshold value. Otherwise the encoding means carries out no encoding operation on the subordinate sample points in the higher frequency subband.

BRIEF DESCRIPTION OF THE DRAWING

FIG. 11 shows still another hierarchical structure for sixty-four sample points in the particular subset illustrated in FIG. 4.

DESCRIPTION OF THE PREFERRED EMBODIMENT

Figure 1:
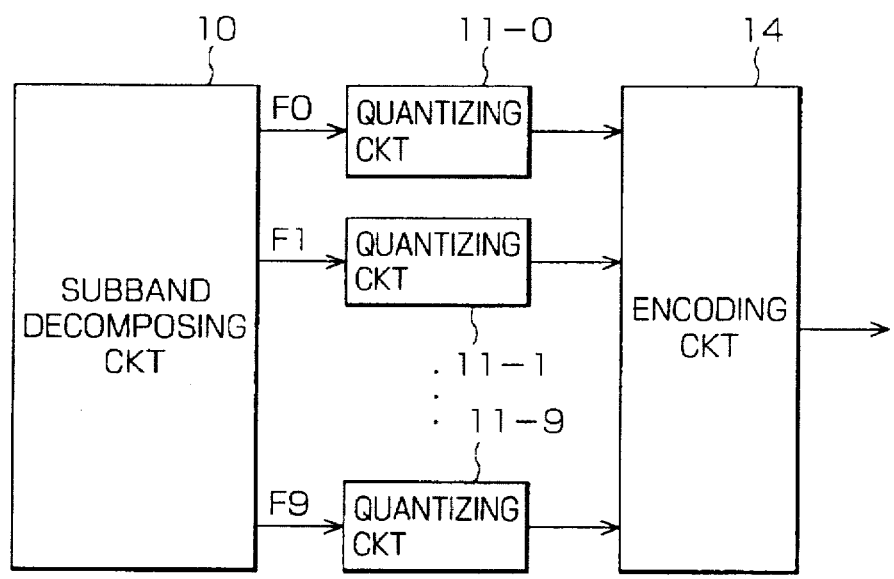
FIG. 1 is a block diagram of a conventional image encoding device.

Referring to FIG. 1, a conventional image encoding device will be described in order to facilitate an understanding of this invention.

The image encoding device is operable to an input image signal to encode the input image signal into an output encoded signal. The image encoding device comprises a subband decomposing circuit 10, zeroth through ninth quantizing circuits 11-0, 11-1, . . . , 11-9, and an encoding circuit 14. The subband decomposing circuit 10 is supplied with the input image signal. In the manner which will later be described, the subband decomposing circuit 10 decomposes the input image signal into zeroth through ninth frequency subbands F0 to F9 each of which includes a plurality of sample points and subsamples the sample points of the frequency subbands. The zeroth through the ninth frequency subbands F0 to F9 are supplied to the zeroth through the ninth quantizing circuits 11-0 to 11-9. The zeroth through the ninth quantizing circuits 11-0 to 11-9 quantize the sample points of the zeroth through the ninth frequency subbands F0 to F9 into zeroth through ninth quantized signals, respectively. The zeroth through the ninth quantized signals are supplied to the encoding circuit 14. The encoding circuit 14 encodes the zeroth through the ninth quantized signals into the output encoded signal.

Figure 2:
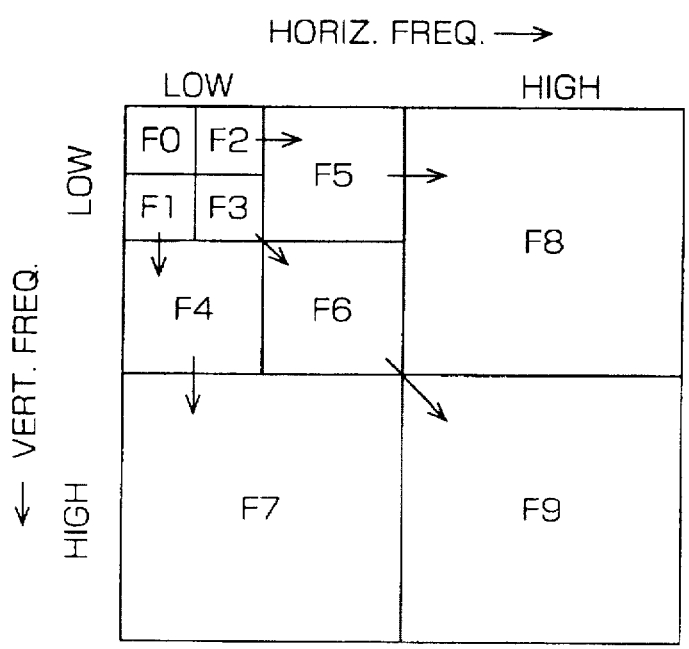
FIG. 2 shows frequency subbands decomposed by a subband decomposing circuit for use in the conventional image encoding device illustrated in FIG. 1.

FIG. 2 shows the zeroth through the ninth frequency subbands F0 to F9 decomposed by the subband decomposing circuit 10. In FIG. 2, the abscissa and the ordinate represent horizontal frequency and vertical frequency, respectively. Each frequency subband represents a band of spatial frequencies. The zeroth frequency subband F0 corresponds to a band of lowest frequencies of the input image signal. The ninth frequency subband F9 corresponds to a band of highest frequencies of the input image signal.

Figure 3:
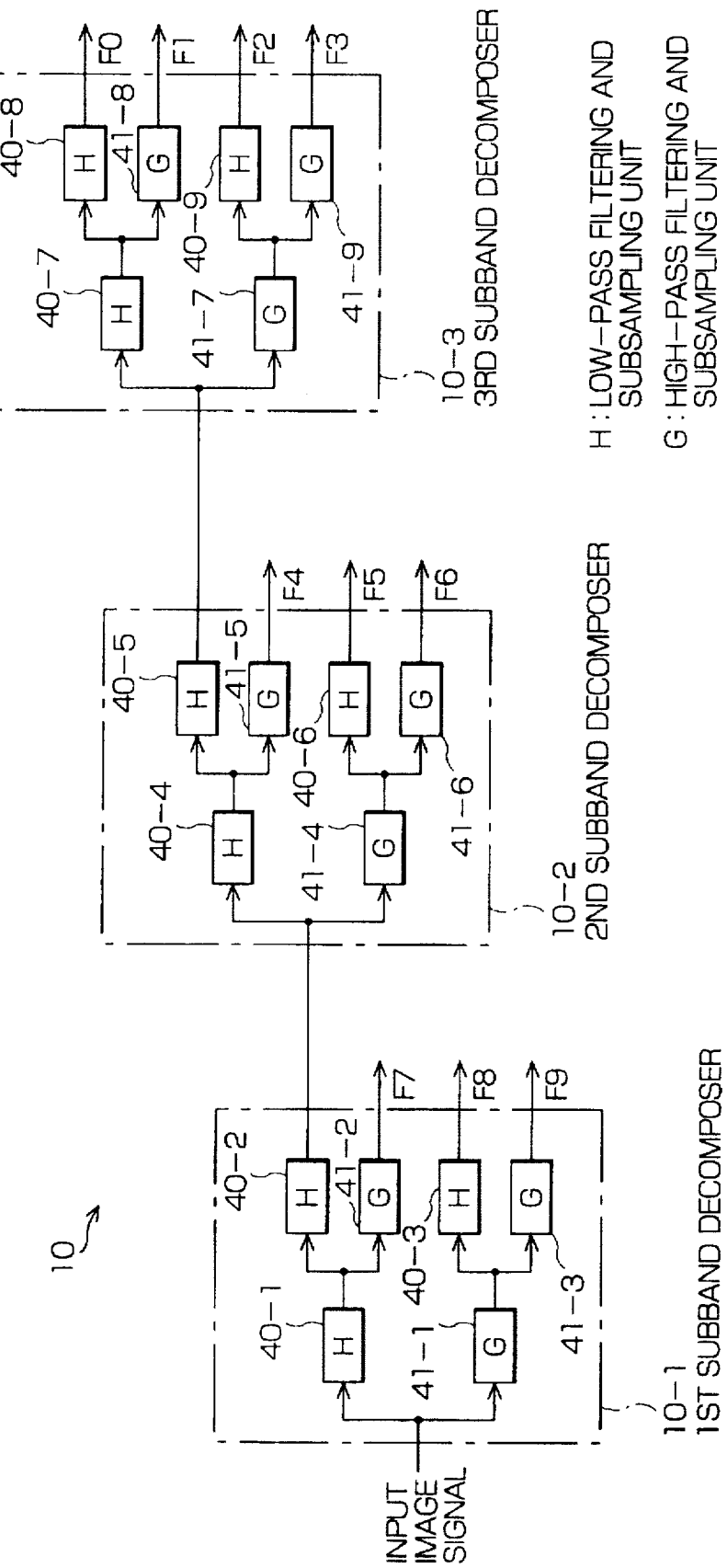
FIG. 3 is a block diagram of a subband decomposing circuit for use in the conventional image encoding device illustrated in FIG. 1.

Turning to FIG. 3, the subband decomposing circuit 10 comprises first through third subband decomposers 10-1, 10-2, and 10-3. The first subband decomposer 10-1 decomposes the input image signal into four frequency subbands at a first decomposition level. One of the four frequency subbands is a frequency subband which includes the zeroth through the sixth frequency subbands F0 to F6 while other three of the four frequency subbands are the seventh through the ninth frequency subbands F7, F8, and F9. The frequency subband including the zeroth though the sixth frequency subbands F0 to F6 contains simultaneously low frequency horizontal and low frequency vertical information. The seventh frequency subband F7 contains low frequency horizontal information and high frequency vertical information (i.e., vertical edge information). The eighth frequency subband F8 contains high frequency horizontal information and low frequency vertical information (i.e., horizontal edge information). The ninth frequency subband F9 contains high frequency horizontal information and high frequency vertical information (i.e., texture or diagonal edge information).

More specifically, the first subband decomposer 10-1 comprises first through third low-pass filtering and subsampling units 40-1, 40-2, and 40-3 and first through third high-pass filtering and subsampling units 41-1, 41-2, and 41-3. The first low-pass filtering and subsampling unit 40-1 horizontally low-pass filters the input image signal to produce a first horizontally low-pass filtered signal and then horizontally subsamples the first horizontally low-pass filtered signal by two to produce a first low-pass filtered and subsampled output signal. The first high-pass filtering and subsampling unit 41-1 horizontally high-pass filters the input image signal to produce a first horizontally high-pass filtered signal and then horizontally subsamples the first horizontally high-pass filtered signal by two to produce a first high-pass filtered and subsampled output signal.

The second low-pass filtering and subsampling unit 40-2 vertically low-pass filters the first low-pass filtered and subsampled output signal to produce a first vertically low-pass filtered signal and then vertically subsamples the first vertically low-pass filtered signal by two to produce a second low-pass filtered and subsampled output signal. The second low-pass filtered and subsampled output signal is supplied to the second subband decomposer 10-2. The second high-pass filtering and subsampling unit 41-2 vertically high-pass filters the first low-pass filtered and subsampled output signal to produce a first vertically high-pass filtered signal and then vertically subsamples the first vertically high-pass filtered signal by two to produce a second high-pass filtered and subsampled output signal as the seventh frequency subband F7.

Likewise, the third low-pass filtering and subsampling unit 40-3 vertically low-pass filters the first high-pass filtered and subsampled output signal to produce a second vertically low-pass filtered signal and then vertically subsamples the second vertically low-pass filtered signal by two to produce a third low-pass filtered and subsampled output signal as the eighth frequency subband F8. The third high-pass filtering and subsampling unit 41-3 vertically high-pass filters the first high-pass filtered and subsampled output signal to produce a second vertically high-pass filtered signal and then vertically subsamples the second vertically high-pass filtered signal by two to produce a third high-pass filtered and subsampled output signal as the ninth frequency subband F9.

The second subband decomposer 10-2 decomposes the second low-pass filtered and subsampled output signal into four frequency subbands at a second lower decomposition level. One of the four frequency subbands is a frequency subband which includes the zeroth through the third frequency subbands F0 to F3 while other three of the four frequency subbands are the fourth through the sixth frequency subbands F4, F5, and F6.

More specifically, the second subband decomposer 10-2 comprises fourth through sixth low-pass filtering and subsampling units 40-4, 40-5, and 40-6 and fourth through sixth high-pass filtering and subsampling units 41-4, 41-5, and 41-6. The fourth low-pass filtering and subsampling unit 40-4 horizontally low-pass filters the second low-pass filtered and subsampled output signal to produce a second horizontally low-pass filtered signal and then horizontally subsamples the second horizontally low-pass filtered signal by two to produce a fourth low-pass filtered and subsampled output signal. The fourth high-pass filtering and subsampling unit 41-4 horizontally high-pass filters the second low-pass filtered and subsampled output signal to produce a second horizontally high-pass filtered signal and then horizontally subsamples the second horizontally high-pass filtered signal by two to produce a fourth high-pass filtered and subsampled output signal.

The fifth low-pass filtering and subsampling unit 40-5 vertically low-pass filters the fourth low-pass filtered and subsampled output signal to produce a third vertically low-pass filtered signal and then vertically subsamples the third vertically low-pass filtered signal by two to produce a fifth low-pass filtered and subsampled output signal. The fifth low-pass filtered and subsampled output signal is supplied to the third subband decomposer 10-3. The fifth high-pass filtering and subsampling unit 41-5 vertically high-pass filters the fourth low-pass filtered and subsampled output signal to produce a third vertically high-pass filtered signal and then vertically subsamples the third vertically high-pass filtered signal by two to produce a fifth high-pass filtered and subsampled output signal as the fourth frequency subband F4.

Likewise, the sixth low-pass filtering and subsampling unit 40-3 vertically low-pass filters the fourth high-pass filtered and subsampled output signal to produce a fourth vertically low-pass filtered signal and then vertically subsamples the fourth vertically low-pass filtered signal by two to produce a sixth low-pass filtered and subsampled output signal as the fifth frequency subband F5. The sixth high-pass filtering and subsampling unit 41-6 vertically high-pass filters the fourth high-pass filtered and subsampled output signal to produce a fourth vertically high-pass filtered signal and then vertically subsamples the fourth vertically high-pass filtered signal by two to produce a sixth high-pass filtered and subsampled output signal as the sixth frequency subband F6.

The third subband decomposer 10-3 decomposes the fifth low-pass filtered and subsampled output signal into four subbands at a third lower decomposition level. The four subbands are the zeroth through the third frequency subbands F0 to F3.

More specifically, the third subband decomposer 10-3 comprises seventh through ninth low-pass filtering and subsampling units 40-7, 40-8, and 40-9 and seventh through ninth high-pass filtering and subsampling units 41-7, 41-8, and 41-9. The seventh low-pass filtering and subsampling unit 40-7 horizontally low-pass filters the fifth low-pass filtered and subsampled output signal to produce a third horizontally low-pass filtered signal and then horizontally subsamples the third horizontally low-pass filtered signal by two to produce a seventh low-pass filtered and subsampled output signal. The seventh high-pass filtering and subsampling unit 41-7 horizontally high-pass filters the fifth low-pass filtered and subsampled output signal to produce a third horizontally high-pass filtered signal and then horizontally subsamples the third horizontally high-pass filtered signal by two to produce a seventh high-pass filtered and subsampled output signal.

The eighth low-pass filtering and subsampling unit 40-8 vertically low-pass filters the seventh low-pass filtered and subsampled output signal to produce a fifth vertically low-pass filtered signal and then vertically subsamples the fifth vertically low-pass filtered signal by two to produce an eighth low-pass filtered and subsampled output signal as the zeroth frequency subband F0. The eighth high-pass filtering and subsampling unit 41-8 vertically high-pass filters the seventh low-pass filtered and subsampled output signal to produce a fifth vertically high-pass filtered signal and then vertically subsamples the fifth vertically high-pass filtered signal by two to produce an eighth high-pass filtered and subsampled output signal as the first frequency subband F1.

Likewise, the ninth low-pass filtering and subsampling unit 40-9 vertically low-pass filters the seventh high-pass filtered and subsampled output signal to produce a sixth vertically low-pass filtered signal and then vertically subsamples the sixth vertically low-pass filtered signal by two to produce a ninth low-pass filtered and subsampled output signal as the second frequency subband F2. The ninth high-pass filtering and subsampling unit 41-9 vertically high-pass filters the seventh high-pass filtered and subsampled output signal to produce a sixth vertically high-pass filtered signal and then vertically subsamples the sixth vertically high-pass filtered signal by two to produce a ninth high-pass filtered and subsampled output signal as the third frequency subband F3.

According to J. W. Woods et al, encoding of the sample points is carried out frequency subband by frequency subband. However, respective frequency subbands are independently encoded and therefore correlation between the frequency subbands is not considered, as mentioned in the preamble of the instant specification.

Figure 4:
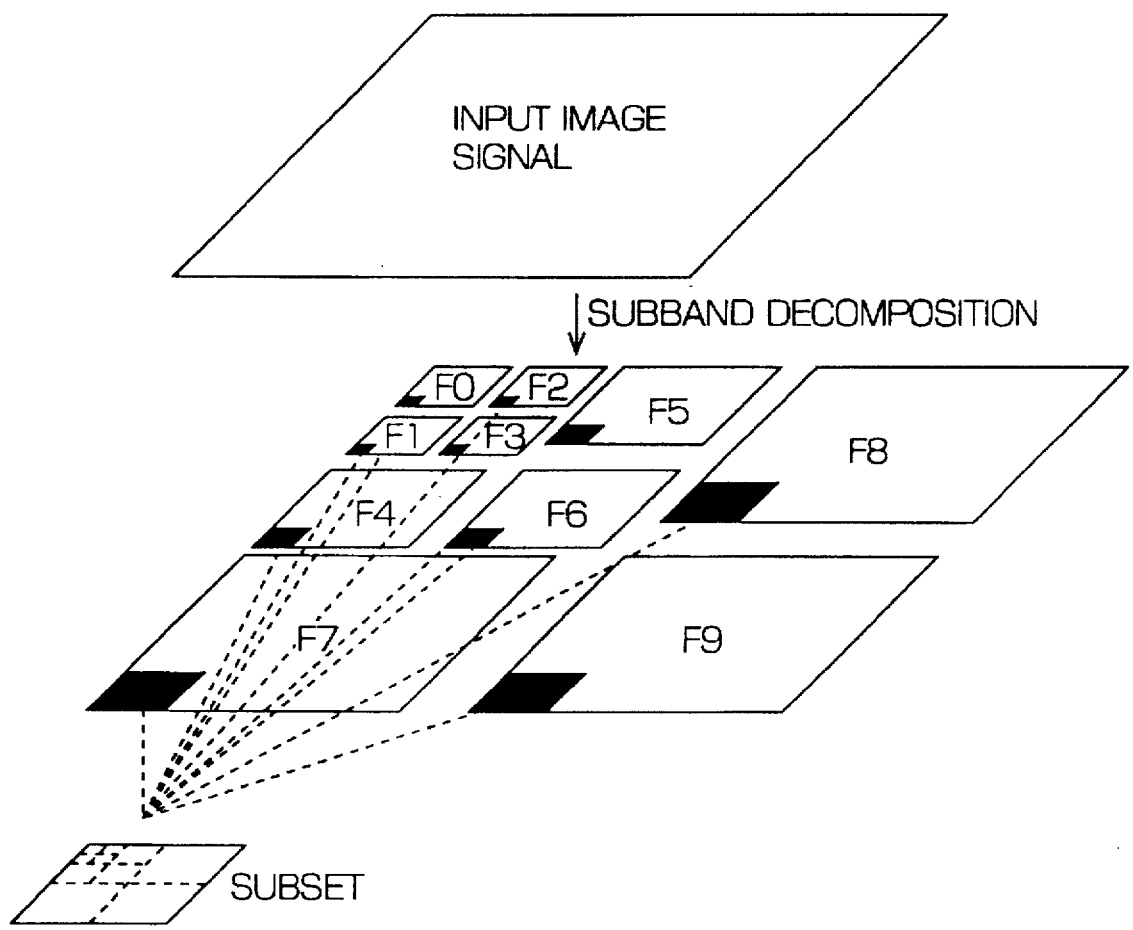
FIG. 4 shows an example of a particular subset of sample points.

FIG. 4 shows an example of a particular subset of sample points disclosed in the above-mentioned Kôkai No. Hei 4-245,863. It is assumed that the input image signal represents an original image of a 256 pixel×256 pixel image. In this event, each of the seventh through the ninth frequency subbands F7, F8, and F9 has 128×128 sample elements. Each of the fourth through the sixth frequency subbands F4, F5, and F7 has 64×64 sample elements. Each of the zeroth through the third frequency subbands F0, F1, F2, and F3 has 32×32 sample elements. The sample elements of the zeroth through the ninth frequency subbands F0 to F9 are divided into a plurality of subsets which are equal in number to one thousand and twenty-four, namely, 1024. Each of the 1024 subsets represents the same spatial domain and includes sixty-four (64) sample elements. In FIG. 4, the particular subset is shaded black and represents horizontally low and vertically high frequencies in each of the zeroth through the ninth frequency subbands F0 to F9. In each subset, each of the seventh through the ninth frequency subbands F7 to F9 in the first decomposition level has sixteen sample points, each of the fourth through the sixth frequency subbands F4 to F6 in the second decomposition level has four sample points, and each of the zeroth through the third frequency subbands F0 to F3 in the third decomposition level has only one sample point.

In the Kôkai No. Hei 4-245,863, encoding of the sample points is carried out subset by subset. However, although a particular sample point in a lower frequency subband has a level value of zero, encoding is carried out for subordinate sample points in a higher frequency subband related to the particular sample point of the lower frequency subband if no scanning discontinuous code appears, as also mentioned in the preamble of the instant specification.

Turning back to FIG. 2, the parent-child relationship between corresponding frequency subbands at different decomposition levels is indicated by the solid arrows, which point from a parent element at a relatively coarse data level to a child element at a finer data level. FIG. 2 depicts tree dependencies for a wavelet pyramid where all parents have children in one frequency subband, except for the zeroth frequency subband F0.

In general, there is a very low probability that high frequency components occurs naturally. In addition, when a particular sample point of a lower frequency subband has the level value of zero, there is a high probability that subordinate sample points of a higher frequency subband that represent the same temporal domain and/or the same spatial domain in the particular sample point having the level value of zero. Accordingly, it is possible to inhibit occurrence of unnecessary codes by carrying out no encoding for the subordinate sample points of the higher frequency subband related to the particular sample point of the lower frequency subband having the level value of zero. As a result, it is possible to realize effective encoding in comparison with the conventional subband encoding technique.

Furthermore, the utilization of the above-mentioned correlations between the frequency subbands can apply for encoding the sample points frequency subband by frequency subband. In this case, when a particular sample point of the lower frequency subband has the level value of zero, no encoding is carried out for the subordinate sample points in the corresponding higher frequency subband in the above-mentioned subset which represent the same domain in the input image signal. As a result, it is possible to realize effective encoding relative to the conventional subband technique.

(Principle of the Invention)

Figure 5:
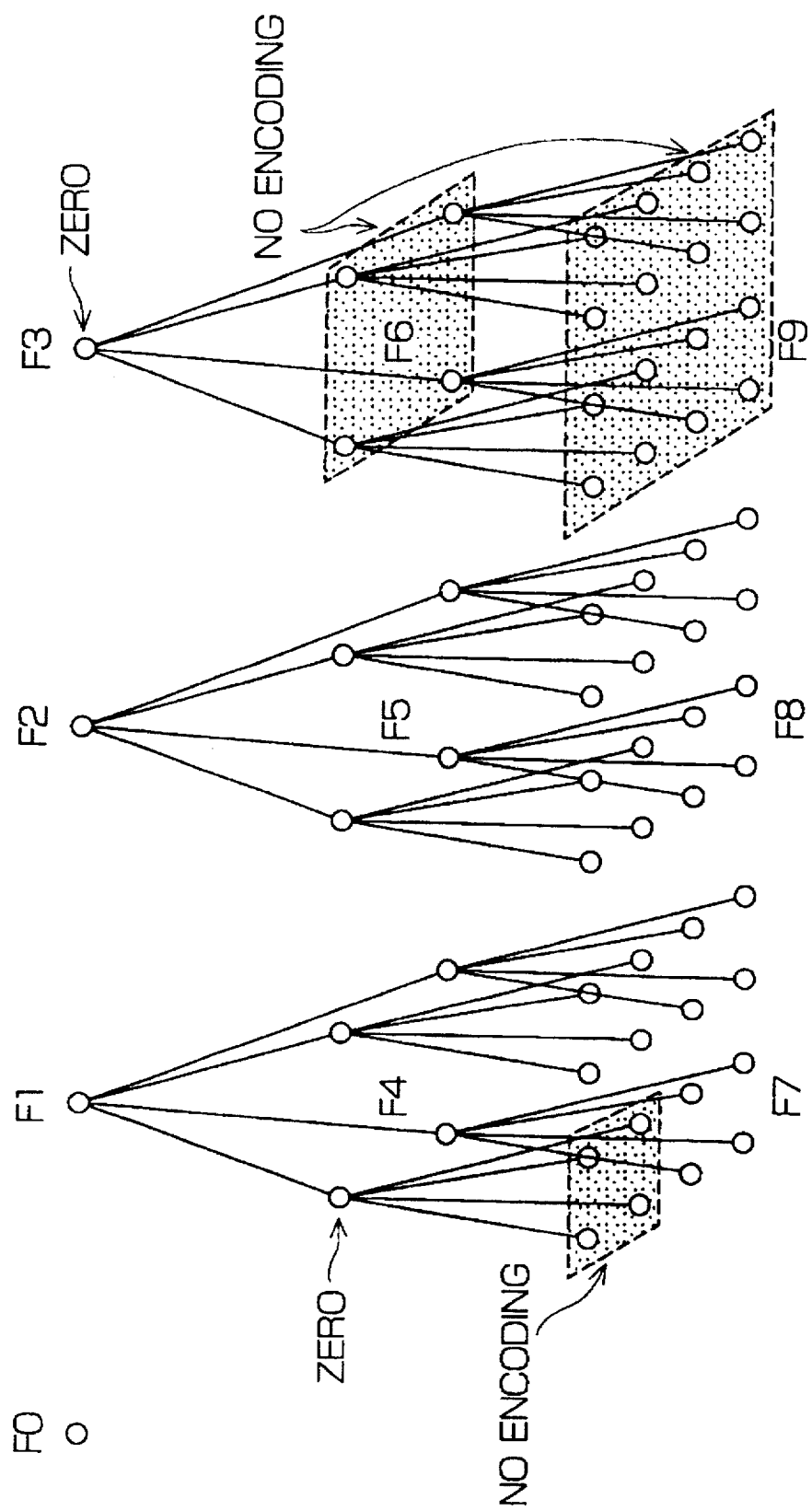
FIG. 5 shows a hierarchical structure for sixty-four sample points in the particular subset illustrated in FIG. 4.

Description will be directed to principles of this invention. As shown in FIG. 5, a hierarchical structure for sample points is established for the particular subset of the sample points representing the same spatial domain in the input image signal, in the similar manner which is described in the afore-mentioned Kôkai No. Hei 4-245,863.

In the example being illustrated, the zeroth frequency subband F0 has no parent-child relationship with any other frequency subband. The first frequency subband F1 has the parent-child relationship with the fourth frequency subband F4 while the fourth frequency subband F4 has the parent-child relationship with the seventh frequency subband F7. Similarly, the second frequency subband F2 has the parent-child relationship with the fifth frequency subband F5 while the fifth frequency subband F5 has the parent-child relationship with the eighth frequency subband F8. The third frequency subband F3 has the parent-child relationship with the sixth frequency subband F6 while the sixth frequency subband F6 has the parent-child relationship with the ninth frequency subband F9.

As described above, the particular subset includes sixty-four sample points. In the particular subset, each of the zeroth through the third frequency subbands F0 to F3 in the third decomposition level has only one sample point, each of the fourth through the sixth frequency subbands F4 to F6 in the second decomposition level has four sample points, and each of the seventh through the ninth frequency subbands F7 to F9 in the first decomposition level has sixteen sample points.

When a particular sample point of a lower frequency subband has a level value of zero, no encoding is carried out for subordinate sample points in a higher frequency subband that represent the same spatial domain in the particular sample point of the lower frequency subband. More specifically, in the example being illustrated, the fourth frequency subband F4 includes a particular sample point, which is shown in the higher left corner thereof, having the level value of zero. In this event, no encoding is carried out for four subordinate sample points (which are enclosed with a dotted square line in the higher left corner) in the seventh frequency subband F7 that have the parent-child relationship with the particular point in the fourth frequency subband F4. In addition, the third frequency subband F3 has the sample point having the level value of zero. In this event, no encoding is carried out for all of four subordinate sample points in the sixth frequency subband F6 and for all of sixteen subordinate sample points in the ninth frequency subband F9. This is because the third frequency subband F3 has the parent-child relationship with the sixth frequency subband F6 and has the parent-grandchild relationship with the ninth frequency subband F9.

With this structure, if a run-length encoding is carried out for the sample points, it is possible to improve encoding efficiency in comparison with the conventional method. This is because occurrence of unnecessary run-length codes is inhibited.

On the other hand, in an image decoding device, when a specific sample point in a lower frequency subband has a decoded result of zero, the corresponding subordinate sample points in a higher frequency subband are set at a level value of zero. As a result, it is possible to correctly decode the sample points without including any useless additional information. This is the principle of a first aspect of this invention.

In addition, a subset of sample points is constructed in accordance with which of temporal domains and/or spatial domains on the input image signal is represented by the sample points included in the respective frequency subbands. When a particular sample point of a lower frequency subband has the level value of zero, the subset may be used to determine that no encoding is carried out for subordinate sample points in a higher frequency subband that represent the same temporal domain and/or the same spatial domain in the particular sample point of the lower frequency subband and actual encoding therefore may be carried out for the sample points frequency subband by frequency subband. In this case, it is possible to reduce the number of picture elements (pixels) in the input image signal for encoding objects and it results in improving encoding efficiency in comparison with the conventional method. This is the principle of a second aspect of this invention.

However, an independent sample point having a large level value occasionally occurs in the higher frequency subband although there is a low probability that it occurs. In this event, partial deterioration of picture quality occurs in a decoded image signal when no encoding is carried out for the independent sample point in the higher frequency subband although the corresponding sample point in a lower frequency subband has a level value of zero. This problem is solved as follows. That is, when a particular sample point in a lower frequency subband has a level value of zero, a sum of absolute values or a sum of square is calculated for subordinate sample points in a higher frequency subband related to the particular point in the lower frequency subband. And then, encoding is carried out for the subordinate sample points in the higher frequency subband when the above-mentioned sum is greater than a predetermined threshold value. Otherwise no encoding is carried out for the subordinate sample points in the higher frequency subband.

(Embodiment)

Figure 6:
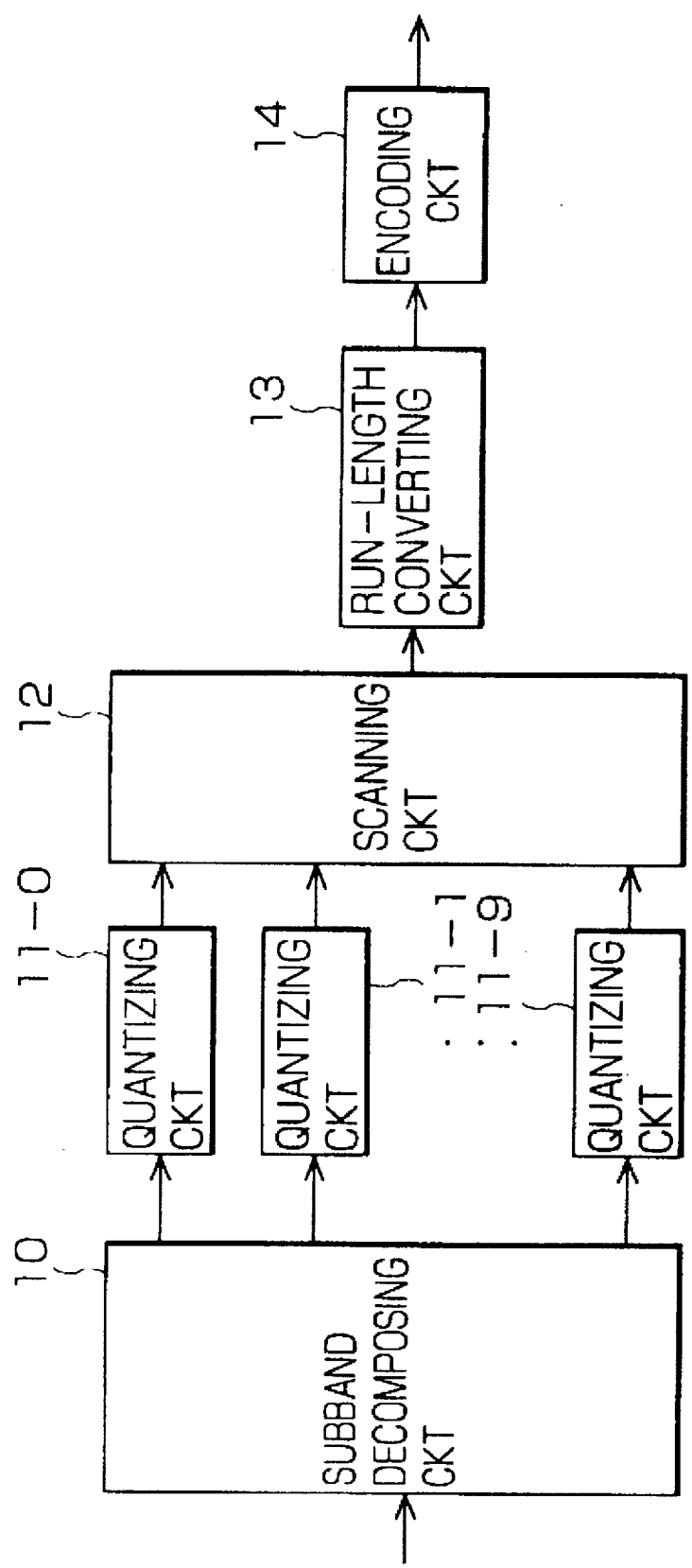
FIG. 6 is a block diagram of an image encoding device according to a preferred embodiment of this invention.

Referring to FIG. 6, description will proceed to an image encoding device according to a preferred embodiment of this invention. The image encoding device is operable to an input image signal to encode the input image signal into an output encoded signal.

The image encoding device comprises a subband decomposing circuit 10, zeroth through ninth quantizing circuits 11-0, 11-1, . . . , and 11-9, a scanning circuit 12, a run-length converting circuit 13, and an encoding circuit 14. The subband decomposing circuit 10 is supplied with the input image signal. The subband decomposing circuit 10 decomposes the input image signal into zeroth through ninth frequency subbands F0 to F9 as shown in FIG. 2. Each of the zeroth through the ninth frequency subbands F0 to F9 includes a plurality of sample points as shown in FIG. 4. The zeroth through the ninth frequency subbands F0 to F9 are supplied to the zeroth through the ninth quantizing circuits 11-0 to 11-9, respectively. An n-th quantizing circuit 11-n quantizes the sample points in an n-th frequency subband Fn into an n-th quantized signal where n represents a variable between zero and nine, both inclusive. The zeroth through the ninth quantized signals are supplied to the scanning circuit 12. At any rate, a combination of the subband decomposing circuit 10 and the zeroth through the ninth quantizing circuits 11-0 to 11-9 serves as a decomposing arrangement.

The scanning circuit 12 scans the zeroth through the ninth quantized signals to produce a train of one-dimensional signals. As described in conjunction with FIG. 4, the 1024 subsets are constructed or composed for the sample points in the zeroth through the ninth frequency subbands F0 to F9. The scanning circuit 12 is operable in either a first mode or a second mode. In the first mode, the scanning circuit 12 scans for the sample points in each of the 1024 subsets. In the second mode, the scanning circuit 12 scans for the sample points in each of the zeroth through the ninth frequency subbands F0 to F9. The run-length converting circuit 13 is connected to the scanning circuit 12. The run-length converting circuit 13 carries out a run-length converting operation on the train of the one-dimensional signals to produce run-length codes and level signals. Each of the run-length codes indicates a continuous length of zero level values. Each of the level signals indicates a nonzero level value. The encoding circuit 14 is connected to the run-length converting circuit 13. The encoding circuit 14 carries out entropy encoding operation on the run-length codes and the level signals to produce the output encoded signal.

At any rate, a combination of the scanning circuit 12, the run-length converting circuit 13, and the encoding circuit 14 acts as an encoding arrangement. When the scanning circuit 12 is operable in the first mode, the encoding arrangement encodes the sample points subset by subset in consideration of correlation between the frequency subbands to produce the output encoded signal. When the scanning circuit 12 is operable in the second mode, the encoding arrangement encodes the sample points frequency subband by frequency subband in consideration of correlation between the frequency subbands to produce the output encoded signal.

Figure 7:
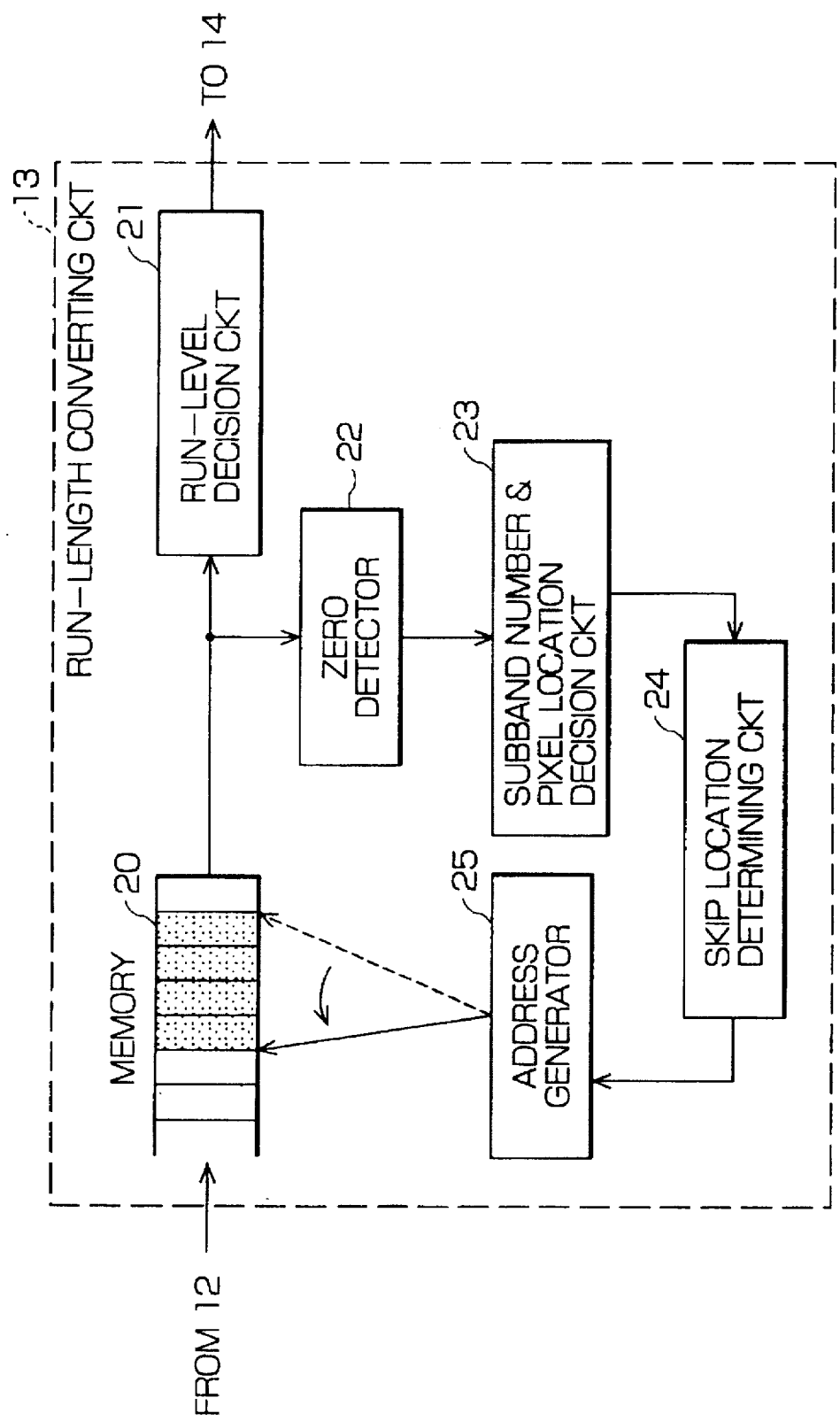
FIG. 7 is a block diagram of a run-length converting circuit for use in the image encoding device illustrated in FIG. 6.

Turning to FIG. 7, the run-length converting circuit 13 comprises a memory 20, a run-level decision circuit 21, a zero detector 22, a subband number and pixel location decision circuit 23, a skip location determining circuit 24, and an address generator 25.

The memory 20 is connected to the scanning circuit 12 (FIG. 6). The memory 20 stores the train of the one-dimensional signals as stored signals. In the manner which will later become clear, the memory 20 selectively produces the stored signals as read signals. The read signals are supplied to the run-level decision circuit 21 and the zero detector 22. The run-level decision circuit 21 is connected to the memory 20. The run-level decision circuit 21 decides signal levels of the read signals to produce the run-length codes and the level signals. The zero detector 22 is connected to the memory 20. The zero detector 22 detects a zero-level signal in the read signals that has level value of zero. The zero-level signal corresponds to the particular sample point. The zero detector 22 produces a zero detection signal on detection of the zero-level signal. The zero detection signal is supplied to the subband number and pixel location decision circuit 23.

The subband number and pixel location decision circuit 23 is connected to the zero detector 22. Responsive to the zero detection signal, the subband number and pixel location decision circuit 23 decides an original subband number of an original frequency subband to which the zero-level signal belongs and an original location of the zero-level signal in the original frequency subband. The subband number and pixel location decision circuit 23 produces an index signal indicative of the original subband number and a pixel location signal indicative of the original location. The index signal and the pixel location signal are supplied to the skip location determining circuit 24.

The skip location determining circuit 24 is connected to the subband number and pixel location decision circuit 23. The skip location determining circuit 24 determines, on the basis of the index signal and the pixel location signal, a subordinate subband number of the higher frequency subband related to the original frequency subband and subordinate locations of subordinate stored signals in the higher frequency subband related to the original location. The skip location determining circuit 24 produces a skip location signal indicative of skip locations which are defined as the subordinate subband number and the subordinate locations. The skip location signal is supplied to the address generator 25.

The address generator 25 is connected to the skip location determining circuit 24 and the memory 20. The address generator 25 generates readout addresses for the memory 20 to selectively read, as the read signals, the stored signals out of the memory 20 so as to make the memory 20 skip the subordinate stored signals in the higher frequency subband that are located in the skip location in accordance with the skip location signal as depicted at an arrow.

With this structure, when the particular sample in the lower frequency subband indicates zero, the encoding arrangement carries out no encoding operation on the subordinate sample points in the higher frequency band related to the particular sample point in the lower frequency band.

Figure 8:
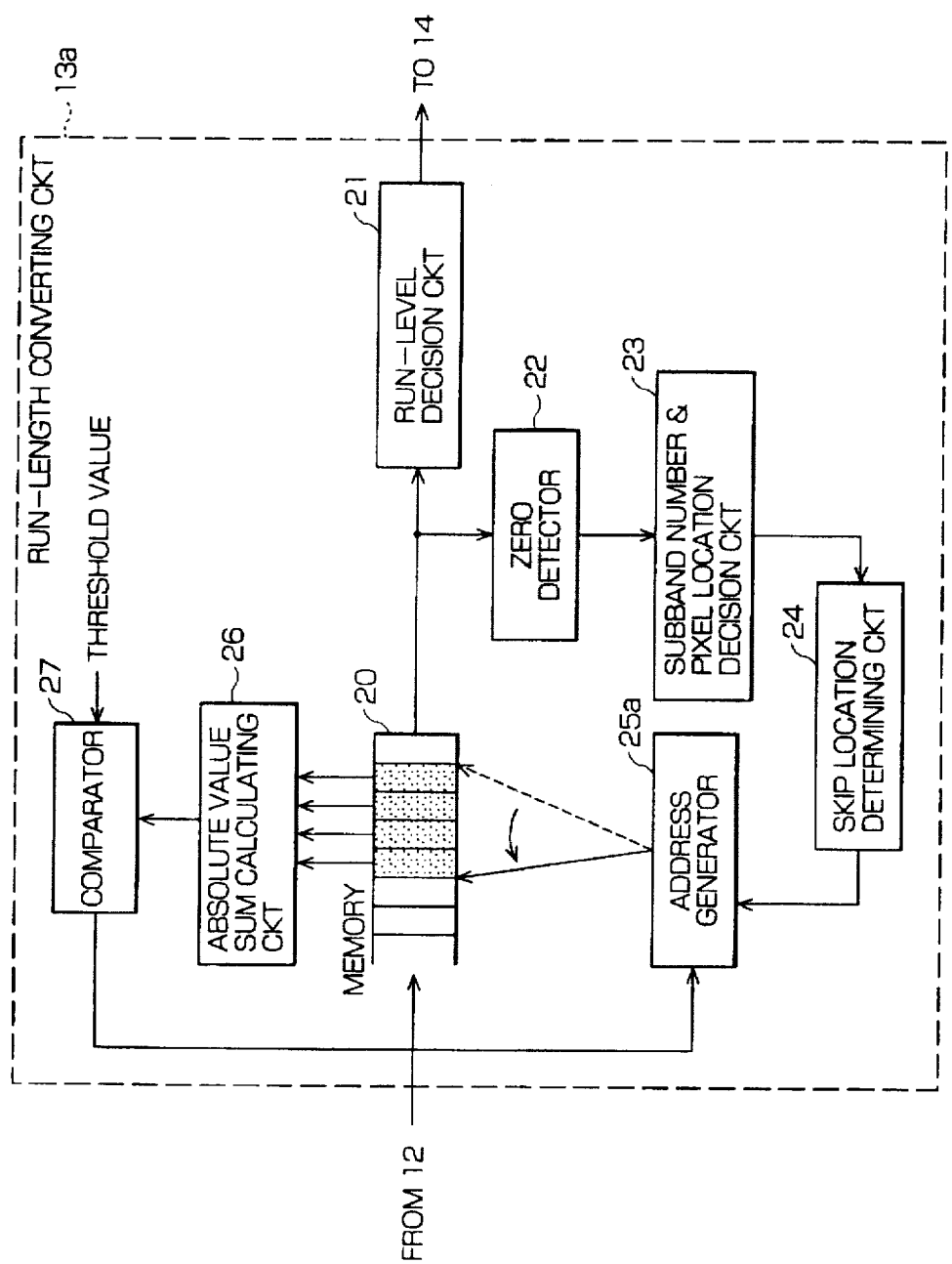
FIG. 8 is a block diagram of another run-length converting circuit for use in the image encoding device illustrated in FIG. 6.

Turning to FIG. 8, another run-length converting circuit 13a is similar in structure to that illustrated in FIG. 7 except that the address generator 25 is modified into another address generator 25a in the manner which will later become clear and the run-length converting circuit 13a further comprises an absolute value sum calculating circuit 26 and a comparator 27.

The absolute value sum calculating circuit 26 is connected to the memory 20. The absolute value sum calculating circuit 26 calculates a sum of absolute values of the subordinate stored signals in the higher frequency subband related to the zero-level signal. The sum of the absolute values is supplied to the comparator 27.

The comparator 27 is connected to the absolute value sum calculating circuit 26 and the address generator 25a. The comparator 27 is supplied with a predetermined threshold value. The comparator 27 compares the sum of the absolute values with the predetermined threshold value. When the sum of the absolute value is greater than the predetermined threshold value, the comparator 27 supplies the address generator 25a with a skip release signal so as to make the address generator 25a release skip operation for the subordinate stored signals.

With this structure, when the particular sample point in the lower frequency subband indicates zero, the encoding arrangement calculates the sum of the absolute values of the subordinate sample points in the higher frequency subband related to the particular sample point in the lower frequency subband. And then, the encoding arrangement encodes the subordinate sample points in the higher frequency band only when the sum of the absolute value is greater than the predetermined threshold value. Otherwise the encoding arrangement carries out no encoding operation on the subordinate sample points in the higher frequency subband.

Figure 9:
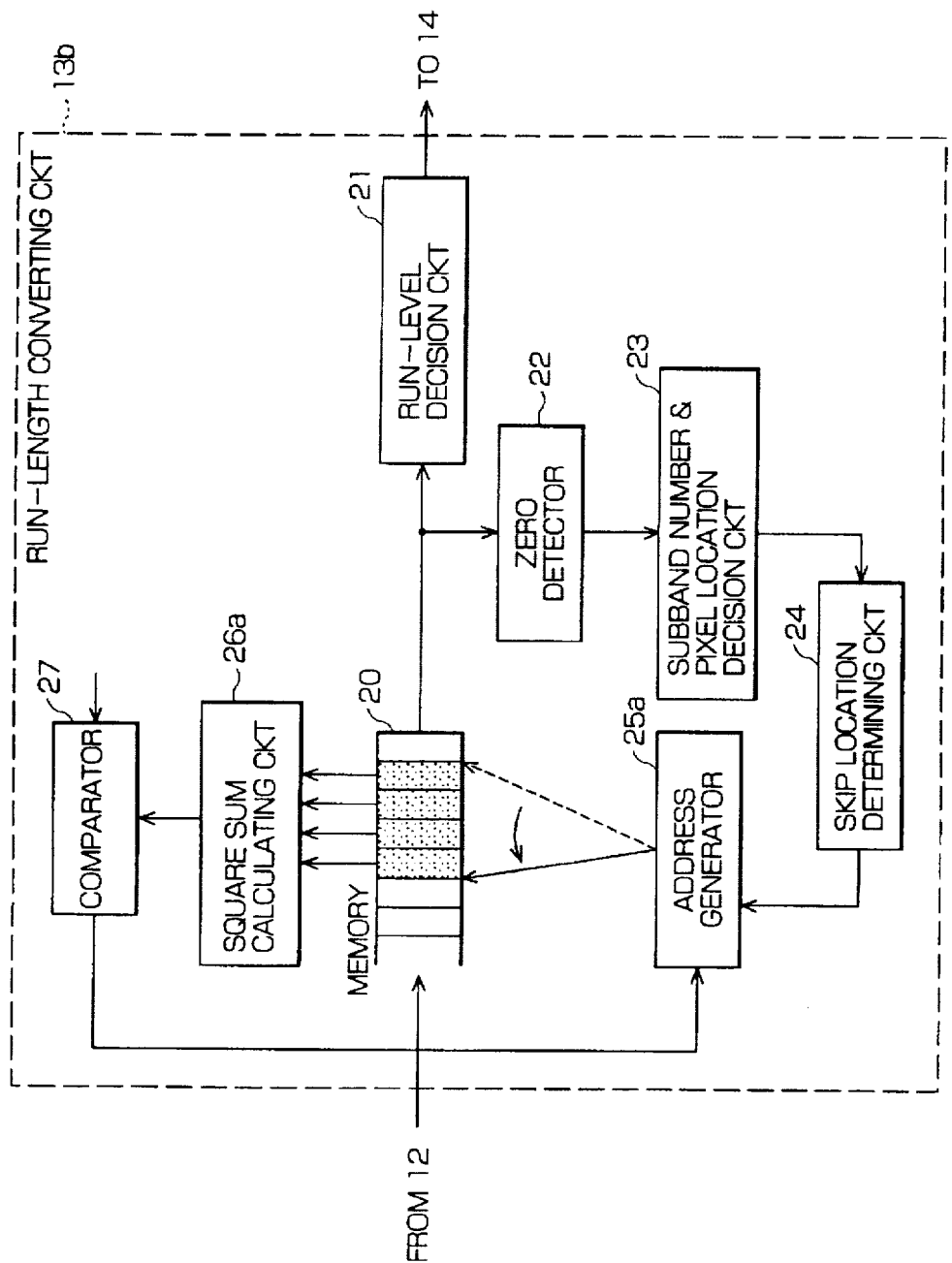
FIG. 9 is a block diagram of still another run-length converting circuit for use in the image encoding device illustrated in FIG. 6.

Turning to FIG. 9, still another run-length converting circuit 13b is similar in structure to that illustrated in FIG. 8 except that the run-length converting circuit 13b comprises a square sum calculating circuit 26a in place of the absolute value sum calculating circuit 26.

The square sum calculating circuit 26a is connected to the memory 20. The square sum calculating circuit 26a calculates a sum of square of the subordinate stored signals in the higher frequency subband related to the zero-level signal. The sum of the square is supplied to the comparator 27.

The comparator 27 is connected to the square sum calculating circuit 26a and the address generator 25a. The comparator 27 compares the sum of the square with the predetermined threshold value. When the sum of the square is greater than the predetermined threshold value, the comparator 27 supplies the address generator 25a with the skip release signal so as to make the address generator 25a release skip operation for the subordinate stored signals.

With this structure, when the particular sample point in the lower frequency subband indicates zero, the encoding arrangement calculates the sum of the square of the subordinate sample points in the higher frequency subband related to the particular sample point in the lower frequency subband. And then, the encoding arrangement encodes the subordinate sample points in the higher frequency band only when the sum of the square is greater than the predetermined threshold value. Otherwise the encoding arrangement carries out no encoding operation on the subordinate sample points in the higher frequency subband.

Figure 10:
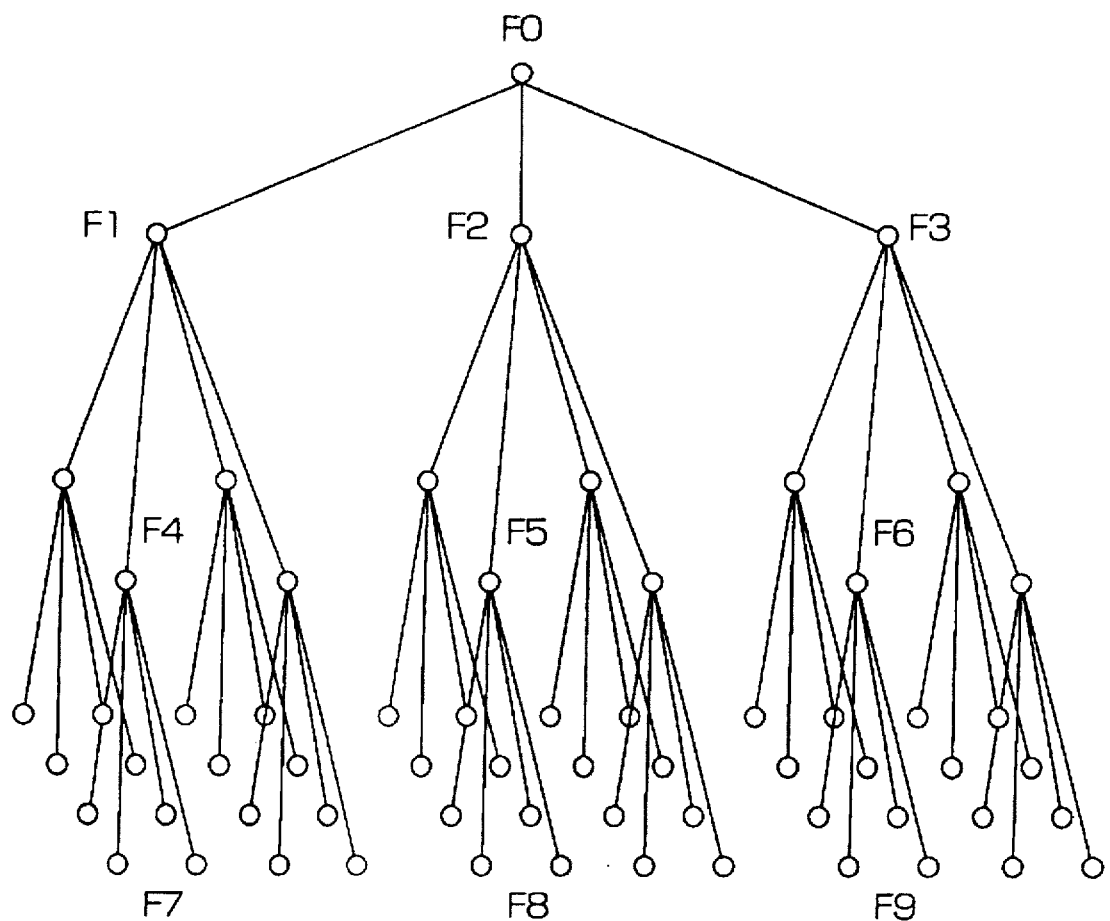
FIG. 10 shows another hierarchical structure for sixty-four sample points in the particular subset illustrated in FIG. 4.

FIG. 10 shows another hierarchical structure for sixty-four sample points in the particular subset. The illustrated hierarchical structure is similar in structure to that illustrated in FIG. 5 except that the zeroth frequency subband F0 has the parent-child relationship with the first through the third frequency subbands F1 to F3. If the sample point of the zeroth frequency subband F0 has a level value of zero, no encoding is carried out for all of subordinate sample points in the first through the ninth frequency subbands F1 to F9.

FIG. 11 shows still another hierarchical structure for sixty-four sample points in the particular subset. In the example being illustrated, the zeroth frequency subset F0 has the parent-child relationship with the first through the third frequency subbands F1 to F3. The first frequency subband F1 has the parent-child relationship with the third and the fourth frequency subbands F3 and F4. The second frequency subband F2 has the parent-child relationship with the third and the fifth frequency subbands F3 and F5. The third frequency subband F3 has the parent-child relationship with the sixth frequency subband F6. The fourth frequency subband F4 has the parent-child relationship with the sixth and the seventh frequency subbands F6 and F7. The fifth frequency subband F5 has the parent-child relationship with the sixth and the eighth frequency subbands F6 and F8. The sixth frequency subband F6 has the parent-child relationship with the ninth frequency subband F9.

In the example being illustrated, the fourth frequency subband F4 includes a particular sample point (which is shown in the higher left corner thereof) having the level value of zero. In this event, no encoding is carried out for a subordinate sample point in the sixth frequency subband F6 (which is shown in the higher left corner thereof), four subordinate sample points in the seventh and the ninth frequency subbands F7 and F9 (both of which are enclosed with a dotted square line in the higher left corner). In addition, the fifth frequency subband F5 includes another particular sample point (which is shown in the lower right corner thereof) having the level value of zero. In this event, no encoding is carried out for a subordinate sample point in the sixth frequency subband F6 (which is shown in the lower right corner thereof), four subordinate sample points in the eighth and the ninth frequency subbands F8 and F9 (both of which are enclosed with a dotted square line in the lower right corner).

While this invention has thus far been described in conjunction with a preferred embodiment thereof, it will now be readily possible for those skilled in the art to put this invention into practice in various other manner. For example, although the sample points in the frequency subbands are divided into a plurality of subsets of sample points wherein the sample points in each subset represent the same spatial domain on the input image signal in the above-mentioned preferred embodiment, the sample points in the frequency subbands may be divided into a plurality of subsets of sample points wherein the sample points in each subset represent either the same temporal domain on the input image signal or the same temporal and spatial domain on the input image signal.

What is claimed is:

1. An image encoding device for encoding an input image signal to produce an output encoded signal, said image encoding device comprising:

decomposing means responsive to the input image signal for decomposing the input image signal into a plurality of frequency subbands each subband including a plurality of sample points, wherein the frequency subbands are classified into lower frequency subbands and higher frequency subbands and the sample points in the frequency subbands are divided into a plurality of subsets of sample points, the sample points in each of the subsets representing the same domain on the input image signal; and encoding means, connected to said decomposing means, for encoding the sample points subset by subset in consideration of correlation between the frequency subbands to produce the output encoded signal so that when a particular sample point in a lower frequency subband indicates a zero value, said encoding means carries out no encoding operation on subordinate sample points which are subordinate to the particular sample point having a zero value in the lower frequency subband.

2. An image encoding device as claimed in claim 1, wherein said same domain is the same spatial domain.

3. An image encoding device as claimed in claim 1, wherein said same domain is the same temporal domain.

4. An image encoding device as claimed in claim 1, wherein said same domain is the same temporal and spatial domain.

5. An image encoding device as claimed in claim 1, wherein said decomposing means comprises:

a subband decomposing circuit responsive to the input image signal for decomposing the input image signal into the frequency subbands; and a plurality of quantizing circuits, connected to said subband decomposing circuit, for quantizing the frequency subbands into quantized signals, respectively.

6. An image encoding device as claimed in claim 1, wherein said encoding means comprises:

a scanning circuit, connected to said decomposing circuit, for scanning the sample points in each subset to produce a train of one-dimensional signals;

a run-length converting circuit, connected to said scanning circuit, for carrying out a run-length converting operation on the train of the one-dimensional signals to produce run-length codes each indicating a continuous length of zero level values and level signals each indicating a nonzero level value; and an encoding circuit, connected to said run-length converting circuit, for carrying out entropy encoding operation on the run-length codes and the level signals to produce the output encoded signal.

7. An image encoding device as claimed in claim 6, wherein said run-length converting circuit comprises:

a memory, connected to said scanning circuit, for storing the train of the one-dimensional signals as stored signals, said memory selectively producing the stored signals as read signals;

a run-level decision circuit, connected to said memory, for deciding signal levels of the read signals to produce the run-length codes and the level signals;

a zero detector, connected to said memory, for detecting a signal having a zero level in the read signals, wherein the zero-level signal corresponds to the particular sample point, said zero detector producing a zero detection signal on detection of the zero-level signal, said zero-level signal belonging to an original frequency subband;

a subband number and pixel location decision circuit, connected to said zero detector, for deciding, in response to the zero detection signal, an original subband number of the original frequency subband and an original location of the zero-level signal in the original frequency subband, said subband number and pixel location decision circuit producing an index signal indicative of the original subband number and a pixel location signal indicative of the original location;

a skip location determining circuit, connected to said subband number and pixel location decision circuit, for determining a subordinate subband number indicative of the higher frequency subband which is subordinate to the original frequency subband and for determining subordinate locations of subordinate stored signals in the higher frequency subband related to the original location, said determining based on the index signal and the pixel location signal, said skip location determining circuit producing a skip location signal indicative of skip locations which are defined by the subordinate subband number and the subordinate locations; and an address generator, connected to said skip location determining circuit and said memory, for generating readout addresses for said memory to selectively read out, as the read signals, the stored signals in said memory so as to make said memory skip the subordinate stored signals in the higher frequency subband in accordance with the skip location signal.

8. An image encoding device for encodingq an input image signal to produce an output encoded signal, said image encoding device comprising:

decomposing means responsive to the input image signal for decomposing the input image signal into a plurality of frequency subbands each subband including a plurality of sample points, wherein the frequency subbands are classified into lower frequency subbands and higher frequency subbands and the sample points in the frequency subbands are divided into a plurality of subsets of sample points, the sample points in each of the subsets representing the same domain on the input image signal; and encoding means, connected to said decomposing means, for encoding the sample points subset by subset in consideration of correlation between the frequency subbands to produce the output encoded signal so that when a particular sample point in a lower frequency subband indicates a zero value, said encoding means calculates a sum of absolute values of subordinate sample points which are subordinate to the particular sample point having a zero value in the lower frequency subband, and then encodes the subordinate sample points in the higher frequency subband only when the sum of the absolute value is greater than a predetermined threshold value, otherwise said encoding means carries out no encoding operation on the subordinate sample points.

9. An image encoding device as claimed in claim 8, wherein said same domain is the same spatial domain.

10. An image encoding device as claimed in claim 8, wherein said same domain is the same temporal domain.

11. An image encoding device as claimed in claim 8, wherein said same domain is the same temporal and spatial domain.

12. An image encoding device as claimed in claim 8, wherein said decomposing means comprises:

a subband decomposing circuit responsive to the input image signal for decomposing the input image signal into the frequency subbands; and a plurality of quantizing circuits, connected to said subband decomposing circuit, for quantizing the frequency subbands into quantized signals, respectively.

13. An image encoding device as claimed in claim 8, wherein said encoding means comprises:

a scanning circuit, connected to said decomposing circuit, for scanning the sample points in each subset to produce a train of one-dimensional signals;

a run-length converting circuit, connected to said scanning circuit, for carrying out a run-length converting operation on the train of the one-dimensional signals to produce run-length codes each indicating a continuous length of zero level values and level signals each indicating a nonzero level value; and an encoding circuit, connected to said run-length converting circuit, for carrying out entropy encoding operation on the run-length codes and the the level signals to produce the output encoded signal.

14. An image encoding device as claimed in claim 13, wherein said run-length converting circuit comprises:

a memory, connected to said scanning circuit, for storing the train of the one-dimensional signals as stored signals, said memory selectively producing the stored signals as read signals;

a run-level decision circuit, connected to said memory, for deciding signal levels of the read signals to produce the run-length codes and the level signals;

a zero detector, connected to said memory, for detecting a signal having a zero level in the stored signals, wherein the zero-level signal corresponds to the particular sample point, said zero detector producing a zero detection signal on detection of the zero-level signal, said zero-level signal belonging to an original frequency subband;

a subband number and pixel location decision circuit, connected to said zero detector, for deciding, in response to the zero detection signal, an original subband number of the original frequency subband and an original location of the zero-level signal in the original frequency subband, said subband number and pixel location decision circuit producing an index signal indicative of the original subband number and a pixel location signal indicative of the original location;

a skip location determining circuit, connected to said subband number and pixel location decision circuit, for determining a subordinate subband number indicative of the higher frequency subband which is subordinate to the original frequency subband and for determining subordinate locations of subordinate stored signals in the higher frequency subband related to the original location, said determining based on the index signal and the pixel location signal, said skip location determining circuit producing a skip location signal indicative of skip locations which are defined by the subordinate subband number and the subordinate locations;

an address generator, connected to said skip location determining circuit and said memory, for generating readout addresses for said memory to selectively read out, as the read signals, the stored signals in said memory so as to make said memory skip the subordinate stored signals in the higher frequency subband in accordance with the skip location signal;

an absolute value sum calculating circuit, connected to said memory, for calculating the sum of the absolute values of the subordinate stored signals in the higher frequency subband related to the zero-level signal; and a comparator, connected to said absolute value sum calculating circuit and said address generator and supplied with the predetermined threshold value, for comparing the sum of the absolute values with the predetermined threshold value, and when the sum of the absolute values is greater that the predetermined threshold value, said comparator supplying a skip release signal to said address generator so as to make said address generator prohibit said memory from skipping the subordinate stored signals in the higher frequency subband.

15. An image encoding device for encoding an input image signal to produce an output encoded signals, said image encoding device comprising:

decomposing means responsive to the input image signal for decomposing the input image signal into a plurality of frequency subbands each subband including a plurality of sample points, wherein the frequency subbands are classified into lower frequency subbands and higher frequency subbands and the sample points in the frequency subbands are divided into a plurality of subsets of sample points, the sample points in each of the subsets representing the same domain on the input image signal; and encoding means, connected to said decomposing means, for encoding the sample points subset by subset in consideration of correlation between the frequency subbands to produce the output encoded signal so that when a particular sample point in a lower frequency subband indicates a zero value, said encoding means calculates a sum of square of subordinate sample points which are subordinate to the particular sample point having a zero value in the lower frequency subband, and then encodes the subordinate sample points in the higher frequency subband only when the sum of the square is greater than a predetermined threshold value, otherwise said encoding means carries out no encoding operation on the subordinate sample points.

16. An image encoding device as claimed in claim 15, wherein said same domain is the same spatial domain.

17. An image encoding device as claimed in claim 15, wherein said same domain is the same temporal domain.

18. An image encoding device as claimed in claim 15, wherein said same domain is the same temporal and spatial domain.

19. An image encoding device as claimed in claim 15, wherein said decomposing means comprises:

a subband decomposing circuit responsive to the input image signal for decomposing the input image signal into the frequency subbands; and a plurality of quantizing circuits, connected to said subband decomposing circuit, for quantizing the frequency subbands into quantized signals, respectively.

20. An image encoding device as claimed in claim 15, wherein said encoding means comprises:

a scanning circuit, connected to said decomposing circuit, for scanning the sample points in each subset to produce a train of one-dimensional signals;

a run-length converting circuit, connected to said scanning circuit, for carrying out a run-length converting operation on the train of the one-dimensional signals to produce run-length codes each indicating a continuous length of zero level values and level signals each indicating a nonzero level value; and an encoding circuit, connected to said run-length converting circuit, for carrying out entropy encoding operation on the run-length codes and the the level signals to produce the output encoded signal.

21. An image encoding device as claimed in claim 20, wherein said run-length converting circuit comprises:

a memory, connected to said scanning circuit, for storing the train of the one-dimensional signals as stored signals, said memory selectively producing the stored signals as read signals;

a run-level decision circuit, connected to said memory, for deciding signal levels of the read signals to produce the run-length codes and the level signals;

a zero detector, connected to said memory, for detecting a signal having a zero level in the stored signals, wherein the zero-level signal corresponds to the particular sample point, said zero detector producing a zero detection signal on detection of the zero-level signal, said zero-level signal belonging to an original frequency subband;

a subband number and pixel location decision circuit, connected to said zero detector, for deciding, in response to the zero detection signal, an original subband number of the original frequency subband and an original location of the zero-level signal in the original frequency subband, said subband number and pixel location decision circuit producing an index signal indicative of the original subband number and a pixel location signal indicative of the original location;

a skip location determining circuit, connected to said subband number and pixel location decision circuit, for determining a subordinate subband number indicative of the higher frequency subband which is subordinate to the original frequency subband and for determining subordinate locations of subordinate stored signals in the higher frequency subband related to the original location, said determining based on the index signal and the pixel location signal, said skip location determining circuit producing a skip location signal indicative of skip locations which are defined by the subordinate subband number and the subordinate locations;

an address generator, connected to said skip location determining circuit and said memory, for generating readout addresses for said memory to selectively read out, as the read signals, the stored signals in said memory so as to make said memory skip the subordinate stored signals in the higher frequency subband in accordance with the skip location signal;

a square sum calculating circuit, connected to said memory, for calculating the sum of the square of the subordinate stored signals in the higher frequency subband related to the zero-level signal; and a comparator, connected to said square sum calculating circuit and said address generator and supplied with the predetermined threshold value, for comparing the sum of the square with the predetermined threshold value, and when the sum of the square is greater that the predetermined threshold value, said comparator supplying a skip release signal to said address generator so as to make said address generator prohibit said memory from skipping the subordinate stored signals in the higher frequency subband.

22. An image encoding device for encoding an input image signal to produce an output encoded signal, said image encoding device comprising:

decomposing means responsive to the input image signal for decomposing the input image signal into a plurality of frequency subbands each subband including a plurality of sample points, wherein the frequency subbands are classified into lower frequency subbands and higher frequency subbands; and encoding means, connected to said decomposing means, for encoding the sample points subset by subset in consideration of correlation between the frequency subbands to produce the output encoded signal so that when a particular sample point in a lower frequency subband indicates a zero value, said encoding means carries out no encoding operation on subordinate sample points which are subordinate to the particular sample point having a zero value in the lower frequency subband.

23. An image encoding device as claimed in claim 22, wherein said same domain is the same spatial domain.

24. An image encoding device as claimed in claim 22, wherein said same domain is the same temporal domain.

25. An image encoding device as claimed in claim 22, wherein said same domain is the same temporal and spatial domain.

26. An image encoding device as claimed in claim 22, wherein said decomposing means comprises:

a subband decomposing circuit responsive to the input image signal for decomposing the input image signal into the frequency subbands; and a plurality of quantizing circuits, connected to said subband decomposing circuit, for quantizing the frequency subbands into quantized signals, respectively.

27. An image encoding device as claimed in claim 22, wherein said encoding means comprises:

a scanning circuit, connected to said decomposing circuit, for scanning the sample points in each frequency subband to produce a train of one-dimensional signals;

a run-length converting circuit, connected to said scanning circuit, for carrying out a run-length converting operation on the train of the one-dimensional signals to produce run-length codes each indicating a continuous length of zero level values and level signals each indicating a nonzero level value; and an encoding circuit, connected to said run-length converting circuit, for carrying out entropy encoding operation on the run-length codes and the the level signals to produce the output encoded signal.

28. An image encoding device as claimed in claim 27, wherein said run-length converting circuit comprises:

a memory, connected to said scanning circuit, for storing the train of the one-dimensional signals as stored signals, said memory selectively producing the stored signals as read signals;

a run-level decision circuit, connected to said memory, for deciding signal levels of the read signals to produce the run-length codes and the level signals;

a zero detector, connected to said memory, for detecting a signal having a zero level in the read signals, wherein the zero-level signal corresponds to the particular sample point, said zero detector producing a zero detection signal on detection of the zero-level signal, said zero-level signal belonging to an original frequency subband;

a subband number and pixel location decision circuit, connected to said zero detector, for deciding, in response to the zero detection signal, an original subband number of the original frequency subband and an original location of the zero-level signal in the original frequency subband, said subband number and pixel location decision circuit producing an index signal indicative of the original subband number and a pixel location signal indicative of the original location;

a skip location determining circuit, connected to said subband number and pixel location decision circuit, for determining a subordinate subband number indicative of the higher frequency subband which is subordinate to the original frequency subband and for determining subordinate locations of subordinate stored signals in the higher frequency subband related to the original location, said determining based on the index signal and the pixel location signal, said skip location determining circuit producing a skip location signal indicative of skip locations which are defined by the subordinate subband number and the subordinate locations; and an address generator, connected to said skip location determining circuit and said memory, for generating readout addresses for said memory to selectively read out, as the read signals, the stored signals in said memory so as to make said memory skip the subordinate stored signals in the higher frequency subband in accordance with the skip location signal.

29. An image encoding device for encoding an input image signal to produce an output encoded signal, said image encoding device comprising:

decomposing means responsive to the input image signal for decomposing the input image signal into a plurality of frequency subbands, each subband including a plurality of sample points, wherein the frequency subbands are classified into lower frequency subbands and higher frequency subbands; and encoding means, connected to said decomposing means, for encoding the sample points frequency subband by frequency subband in consideration of correlation between the frequency subbands to produce the output encoded signal so that when a particular sample point in a lower frequency subband indicates a zero value, said encoding means calculates a sum of absolute values of subordinate sample points which are subordinate to the particular sample point having a zero value in the lower frequency subband, and then encodes the subordinate sample points in the higher frequency subband only when the sum of the absolute value is greater than a predetermined threshold value, otherwise said encoding means carries out no encoding operation on the subordinate sample points.

30. An image encoding device as claimed in claim 29, wherein said same domain is the same spatial domain.

31. An image encoding device as claimed in claim 29, wherein said same domain is the same temporal domain.

32. An image encoding device as claimed in claim 29, wherein said same domain is the same temporal and spatial domain.

33. An image encoding device as claimed in claim 29, wherein said decomposing means comprises:

a subband decomposing circuit responsive to the input image signal for decomposing the input image signal into the frequency subbands; and a plurality of quantizing circuits, connected to said subband decomposing circuit, for quantizing the frequency subbands into quantized signals, respectively.

34. An image encoding device as claimed in claim 29, wherein said encoding means comprises:

a scanning circuit, connected to said decomposing circuit, for scanning the sample points in each frequency subband to produce a train of one-dimensional signals;

a run-length converting circuit, connected to said scanning circuit, for carrying out a run-length converting operation on the train of the one-dimensional signals to produce run-length codes each indicating a continuous length of zero level values and level signals each indicating a nonzero level value; and an encoding circuit, connected to said run-length converting circuit, for carrying out entropy encoding operation on the run-length codes and the the level signals to produce the output encoded signal.

35. An image encoding device as claimed in claim 34, wherein said run-length converting circuit comprises:

a memory, connected to said scanning circuit, for storing the train of the one-dimensional signals as stored signals, said memory selectively producing the stored signals as read signals;

a run-level decision circuit, connected to said memory, for deciding signal levels of the read signals to produce the run-length codes and the level signals;

a zero detector, connected to said memory, for detecting a signal having a zero level in the stored signals, wherein the zero-level signal corresponds to the particular sample point, said zero detector producing a zero detection signal on detection of the zero-level signal, said zero-level signal belonging to an original frequency subband;

a subband number and pixel location decision circuit, connected to said zero detector, for deciding, in response to the zero detection signal, an original subband number of the original frequency subband and an original location of the zero-level signal in the original frequency subband, said subband number and pixel location decision circuit producing an index signal indicative of the original subband number and a pixel location signal indicative of the original location;

a skip location determining circuit, connected to said subband number and pixel location decision circuit, for determining a subordinate subband number indicative of the higher frequency subband which is subordinate to the original frequency subband and for determining subordinate locations of subordinate stored signals in the higher frequency subband related to the original location, said determining based on the index signal and the pixel location signal, said skip location determining circuit producing a skip location signal indicative of skip locations which are defined by the subordinate subband number and the subordinate locations;

an address generator, connected to said skip location determining circuit and said memory, for generating readout addresses for said memory to selectively read out, as the read signals, the stored signals in said memory so as to make said memory skip the subordinate stored signals in the higher frequency subband in accordance with the skip location signal;

an absolute value sum calculating circuit, connected to said memory, for calculating the sum of the absolute values of the subordinate stored signals in the higher frequency subband related to the zero-level signal; and a comparator, connected to said absolute value sum calculating circuit and said address generator and supplied with the predetermined threshold value, for comparing the sum of the absolute values with the predetermined threshold value, and when the sum of the absolute values is greater that the predetermined threshold value, said comparator supplying a skip release signal to said address generator so as to make said address generator prohibit said memory from skipping the subordinate stored signals in the higher frequency subband.

36. An image encoding device for encoding an input image signal to produce an output encoded signal, said image encoding device comprising:

decomposing means responsive to the input image signal for decomposing the input image signal into a plurality of frequency subbands, each subband including a plurality of sample points, wherein the frequency subbands are classified into lower frequency subbands and higher frequency subbands; and encoding means, connected to said decomposing means, for encoding the sample points frequency subband by frequency subband in consideration of correlation between the frequency subbands to produce the output encoded signal so that when a particular sample point in a lower frequency subband indicates a zero value, said encoding means calculates a sum of square of subordinate sample points which are subordinate to the particular sample point having a zero value in the lower frequency subband, and then encodes the subordinate sample points in the higher frequency subband only when the sum of the square is greater than a predetermined threshold value, otherwise said encoding means carries out no encoding operation on the subordinate sample points.

37. An image encoding device as claimed in claim 36, wherein said same domain is the same spatial domain.

38. An image encoding device as claimed in claim 36, wherein said same domain is the same temporal domain.

39. An image encoding device as claimed in claim 36, wherein said same domain is the same temporal and spatial domain.

40. An image encoding device as claimed in claim 36, wherein said decomposing means comprises:

a subband decomposing circuit responsive to the input image signal for decomposing the input image signal into the frequency subbands; and a plurality of quantizing circuits, connected to said subband decomposing circuit, for quantizing the frequency subbands into quantized signals, respectively.

41. An image encoding device as claimed in claim 36, wherein said encoding means comprises:

a scanning circuit, connected to said decomposing circuit, for scanning the sample points in each frequency subband to produce a train of one-dimensional signals;

a run-length converting circuit, connected to said scanning circuit, for carrying out a run-length converting operation on the train of the one-dimensional signals to produce run-length codes each indicating a continuous length of zero level values and level signals each indicating a nonzero level value; and an encoding circuit, connected to said run-length converting circuit, for carrying out entropy encoding operation on the run-length codes and the the level signals to produce the output encoded signal.

42. An image encoding device as claimed in claim 41, wherein said run-length converting circuit comprises:

a memory, connected to said scanning circuit, for storing the train of the one-dimensional signals as stored signals, said memory selectively producing the stored signals as read signals;

a run-level decision circuit, connected to said memory, for deciding signal levels of the read signals to produce the run-length codes and the level signals;

a zero detector, connected to said memory, for detecting a signal having a zero level in the stored signals, wherein the zero-level signal corresponds to the particular sample point, said zero detector producing a zero detection signal on detection of the zero-level signal, said zero-level signal belonging to an original frequency subband;

a subband number and pixel location decision circuit, connected to said zero detector, for deciding, in response to the zero detection signal, an original subband number of the original frequency subband and an original location of the zero-level signal in the original frequency subband, said subband number and pixel location decision circuit producing an index signal indicative of the original subband number and a pixel location signal indicative of the original location;

a skip location determining circuit, connected to said subband number and pixel location decision circuit, for determining a subordinate subband number indicative of the higher frequency subband which is subordinate to the original frequency subband and for determining subordinate locations of subordinate stored signals in the higher frequency subband related to the original location, said determining based on the index signal and the pixel location signal, said skip location determining circuit producing a skip location signal indicative of skip locations which are defined by the subordinate subband number and the subordinate locations;

an address generator, connected to said skip location determining circuit and said memory, for generating readout addresses for said memory to selectively read out, as the read signals, the stored signals in said memory so as to make said memory skip the subordinate stored signals in the higher frequency subband in accordance with the skip location signal;

an absolute value sum calculating circuit, connected to said memory, for calculating the sum of the absolute values of the subordinate stored signals in the higher frequency subband related to the zero-level signal; and a comparator, connected to said absolute value sum calculating circuit and said address generator and supplied with the predetermined threshold value, for comparing the sum of the absolute values with the predetermined threshold value, and when the sum of the absolute values is greater that the predetermined threshold value, said comparator supplying a skip release signal to said address generator so as to make said address generator prohibit said memory from skipping the subordinate stored signals in the higher frequency subband.

* * * * *